US012597562B2

(12) United States Patent
Lee et al.

(10) Patent No.: US 12,597,562 B2
(45) Date of Patent: Apr. 7, 2026

(54) MULTILAYER ELECTRONIC COMPONENT

(71) Applicant: SAMSUNG ELECTRO-MECHANICS CO., LTD., Suwon-si (KR)

(72) Inventors: Ji Young Lee, Suwon-si (KR); Joon Hyub Cha, Suwon-si (KR); Dong Jun Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 141 days.

(21) Appl. No.: 18/738,584

(22) Filed: Jun. 10, 2024

(65) Prior Publication Data

US 2025/0087419 A1 Mar. 13, 2025

(30) Foreign Application Priority Data

Sep. 12, 2023 (KR) ........................ 10-2023-0121183
Dec. 29, 2023 (KR) ........................ 10-2023-0196153

(51) Int. Cl.
*H01G 4/30* (2006.01)
*H01G 4/12* (2006.01)

(52) U.S. Cl.
CPC ............. *H01G 4/1227* (2013.01); *H01G 4/30* (2013.01)

(58) Field of Classification Search
None
See application file for complete search history.

(56) References Cited

U.S. PATENT DOCUMENTS 6,613,706 B2 * 9/2003 Hagiwara ........... C04B 35/6303
                                                            361/321.2
9,076,596 B2 * 7/2015 Yoon ........................ H01G 4/30
(Continued)

FOREIGN PATENT DOCUMENTS

CN          119340109 A  *  1/2025   ............. H01G 4/002
JP        2007-153636 A       6/2007
(Continued)

OTHER PUBLICATIONS

Huang et al., Multifunctional BaTiO3-Based Relaxor Ferroelectrics toward Excellent Energy Storage Performance and Electrostrictive Strain Benefiting from Crossover Region, ACS Appl. Mater. Interfaces 2020, 12, 23885-23895.
(Continued)

*Primary Examiner* — Dion R. Ferguson
(74) *Attorney, Agent, or Firm* — Morgan, Lewis & Bockius LLP

(57) ABSTRACT

A multilayer electronic component may include a body including a capacitance forming portion including a dielectric layer including a plurality of dielectric grains, and a plurality of internal electrodes alternately disposed to be stacked with the dielectric layer; and an external electrode disposed on the body, wherein the plurality of dielectric grains include a first dielectric grain including a nano domain that is a domain region with a major diameter of 10 nm to 100 nm, and a second dielectric grain including a polar nano region including a domain region with a major diameter of less than 10 nm, and when the number of the first dielectric grains included in the capacitance forming portion is ND, and the number of the second dielectric grains included in the capacitance forming portion is RD, 50%<ND/(ND+RD) may be satisfied.

21 Claims, 8 Drawing Sheets

(56) References Cited

U.S. PATENT DOCUMENTS

| | | | | |
|---|---|---|---|---|
| 9,390,856 | B2 * | 7/2016 | Yoon | H01G 4/1227 |
| 9,905,363 | B2 * | 2/2018 | Engel | H01G 4/232 |
| 10,236,125 | B2 * | 3/2019 | Yoon | H01G 4/1227 |
| 10,584,066 | B2 * | 3/2020 | Yoon | C04B 35/49 |
| 2003/0007315 | A1 * | 1/2003 | Morita | H01G 4/1227 |
| | | | | 361/321.4 |
| 2003/0013598 | A1 * | 1/2003 | Hagiwara | C04B 35/6303 |
| | | | | 501/137 |
| 2014/0313634 | A1 | 10/2014 | Yoon et al. | |
| 2015/0131200 | A1 * | 5/2015 | Engel | C04B 35/493 |
| | | | | 501/134 |
| 2015/0371778 | A1 * | 12/2015 | Engel | H01G 4/30 |
| | | | | 361/301.4 |
| 2020/0381179 | A1 | 12/2020 | Yoon et al. | |
| 2022/0157530 | A1 * | 5/2022 | Kim | H01G 4/008 |
| 2022/0181082 | A1 * | 6/2022 | Ham | B32B 18/00 |
| 2023/0215633 | A1 * | 7/2023 | Cho | H01G 4/012 |
| | | | | 361/301.4 |
| 2023/0268126 | A1 * | 8/2023 | Bayer | H01G 4/01 |
| | | | | 361/311 |
| 2024/0194410 | A1 * | 6/2024 | Choi | H01G 4/012 |
| 2024/0203649 | A1 * | 6/2024 | Chun | H01G 4/30 |
| 2025/0087419 | A1 * | 3/2025 | Lee | H01G 4/012 |
| 2025/0157732 | A1 * | 5/2025 | Chun | H01G 4/30 |
| 2025/0218688 | A1 * | 7/2025 | Kim | H01G 4/1209 |

FOREIGN PATENT DOCUMENTS

| | | | | |
|---|---|---|---|---|
| JP | WO2013/146303 A1 | 12/2015 | | |
| JP | 2023079141 A | * 6/2023 | | H01G 4/248 |
| KR | 10-2014-0125000 A | 10/2014 | | |
| KR | 10-2020-0137820 A | 12/2020 | | |
| WO | WO-2021171920 A1 | * 9/2021 | | H01G 4/1209 |

OTHER PUBLICATIONS

Zhou et al., Improved Energy Storage Properties Achieved in (K, Na)NbO3-Based Relaxor Ferroelectric Ceramics via a Combinatorial Optimization Strategy, Adv. Funct. Mater. 2022, 32, 2111776.

* cited by examiner

MULTILAYER ELECTRONIC COMPONENT

CROSS-REFERENCE TO RELATED APPLICATION(S)

This application claims benefit of priority to Korean Patent Application No. 10-2023-0121183 filed on Sep. 12, 2023 and Korean Patent Application No. 10-2023-0196153 filed on Dec. 29, 2023 in the Korean Intellectual Property Office, the disclosures of which are incorporated herein by reference in their entireties.

TECHNICAL FIELD

The present disclosure relates to a multilayer electronic component.

A multilayer ceramic capacitor (MLCC), which is a multilayer electronic component, may be a chip condenser mounted on the printed circuit boards of various types of electronic products such as, image display devices, including a liquid crystal display (LCD), a plasma display panel (PDP), or the like, a computer, a smartphone, a mobile phone, or the like, serving to charge or discharge electricity therein or therefrom.

Such a multilayer ceramic capacitor may be used as a component of various electronic devices, as the multilayer ceramic capacitor has a small size with high capacitance and is easily mounted. As various electronic devices such as computers, mobile devices, or the like have been miniaturized and implemented with high-output, demand for miniaturization and high capacitance of the multilayer ceramic capacitors has increased.

Meanwhile, as the development of high-capacity multilayer ceramic capacitors progresses, research is being conducted toward gradually decreasing a thickness of the dielectric layer, but as there is a limit in thinning the dielectric layer, research is being conducted to improve dielectric characteristics through other mechanisms. Thereamong, it has been revealed that controlling polarization characteristics by external electric or magnetic field as a factor that can affect the dielectric characteristics.

SUMMARY

An aspect of the present disclosure is to provide a multilayer electronic component having improved dielectric characteristics.

An aspect of the present disclosure is to provide a multilayer electronic component having improved dielectric characteristics, as compared to a dielectric layer of the same size or a dielectric grain of the same size.

An aspect of the present disclosure is to provide a multilayer electronic component having improved dielectric characteristics by controlling a microstructure of a domain structure of a dielectric grain.

However, various problems to be solved by the present disclosure are not limited to the above-described contents, and can be more easily understood in a process of explaining specific embodiments of the present disclosure.

According to an aspect of the present disclosure, a multilayer electronic component may include a body including a capacitance forming portion including (i) a dielectric layer including a plurality of dielectric grains, and (ii) a plurality of internal electrodes alternately disposed to be stacked with the dielectric layer; and an external electrode disposed on the body, wherein the plurality of dielectric grains include (i) a first dielectric grain including a nano domain that is a domain region with a major diameter of 10 nm to 100 nm, and (ii) a second dielectric grain including a polar nano region including a domain region with a major diameter of less than 10 nm, and when a number of the first dielectric grains included in the capacitance forming portion is ND, and a number of the second dielectric grains included in the capacitance forming portion is RD, 50%<ND/(ND+RD) may be satisfied.

According to an aspect of the present disclosure, a multilayer electronic component may include a body including a capacitance forming portion including (i) a dielectric layer including a plurality of dielectric grains, and (ii) a plurality of internal electrodes alternately disposed to be stacked with the dielectric layer; and an external electrode disposed on the body, wherein the plurality of dielectric grains include (i) a first dielectric grain including a nano domain that is a domain region with a major diameter of 10 nm to 100 nm, and (ii) a second dielectric grain including a polar nano region including a domain region with a major diameter of less than 10 nm, and a number of the first dielectric grain included in the capacitance forming portion is greater than a number of the second dielectric grain included in the capacitance forming portion.

According to an aspect of the present disclosure, a multilayer electronic component may include a body including a capacitance forming portion including (i) a dielectric layer including a plurality of dielectric grains, and (ii) a plurality of internal electrodes alternately disposed to be stacked with the dielectric layer; and an external electrode disposed on the body, wherein the plurality of dielectric grains include (i) a first dielectric grain including a nano domain that is a domain region with a major diameter of 80 nm to 100 nm, and (ii) a second dielectric grain including a polar nano region including a domain region with a major diameter of less than 10 nm.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
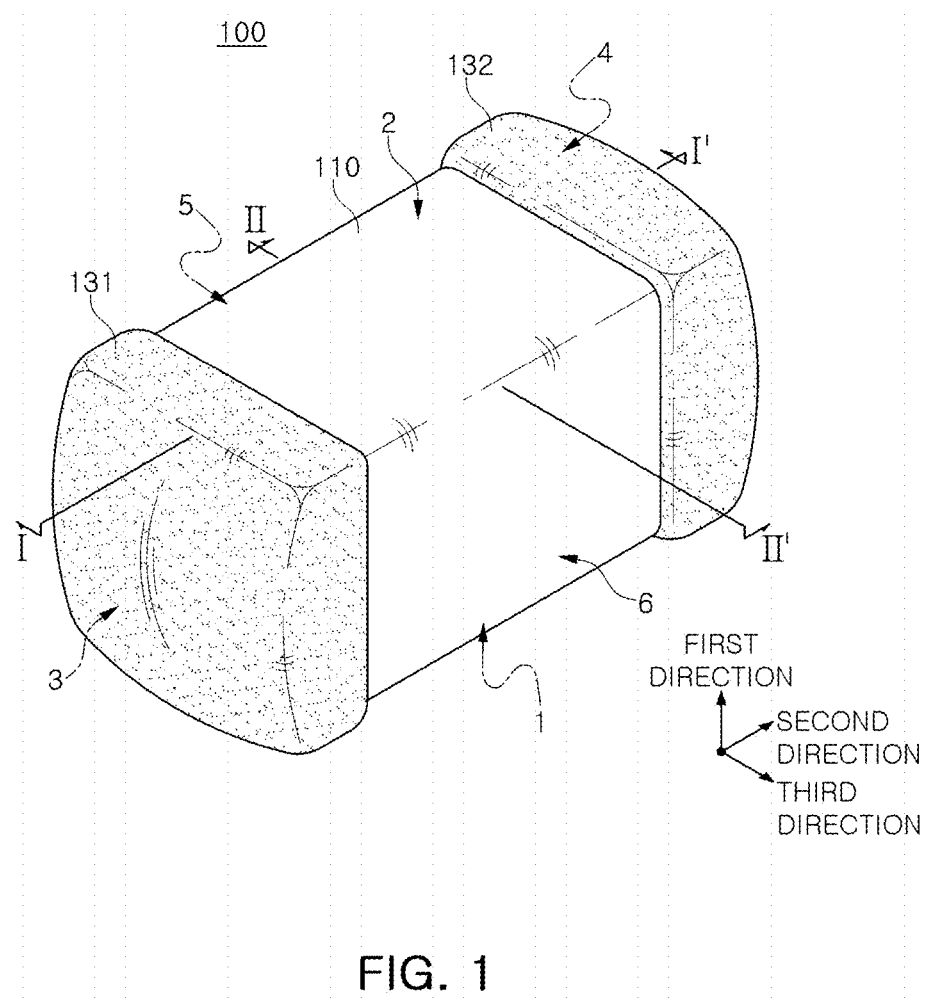
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes, sizes, and the like, of the elements in the drawings may be exaggerated for clarity of description, and the elements denoted by the same reference numerals in the drawings may be the same elements.

In addition, in order to clearly illustrate the present disclosure in the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, a first direction may be defined as a stacking direction or a thickness (T) direction, a second direction may be defined as a length (L) direction, and a third direction may be defined as a width (W) direction.

Multilayer Electronic Component

FIG. 1 schematically illustrates a perspective view of a multilayer electronic component according to an embodiment of the present disclosure.

Figure 2:
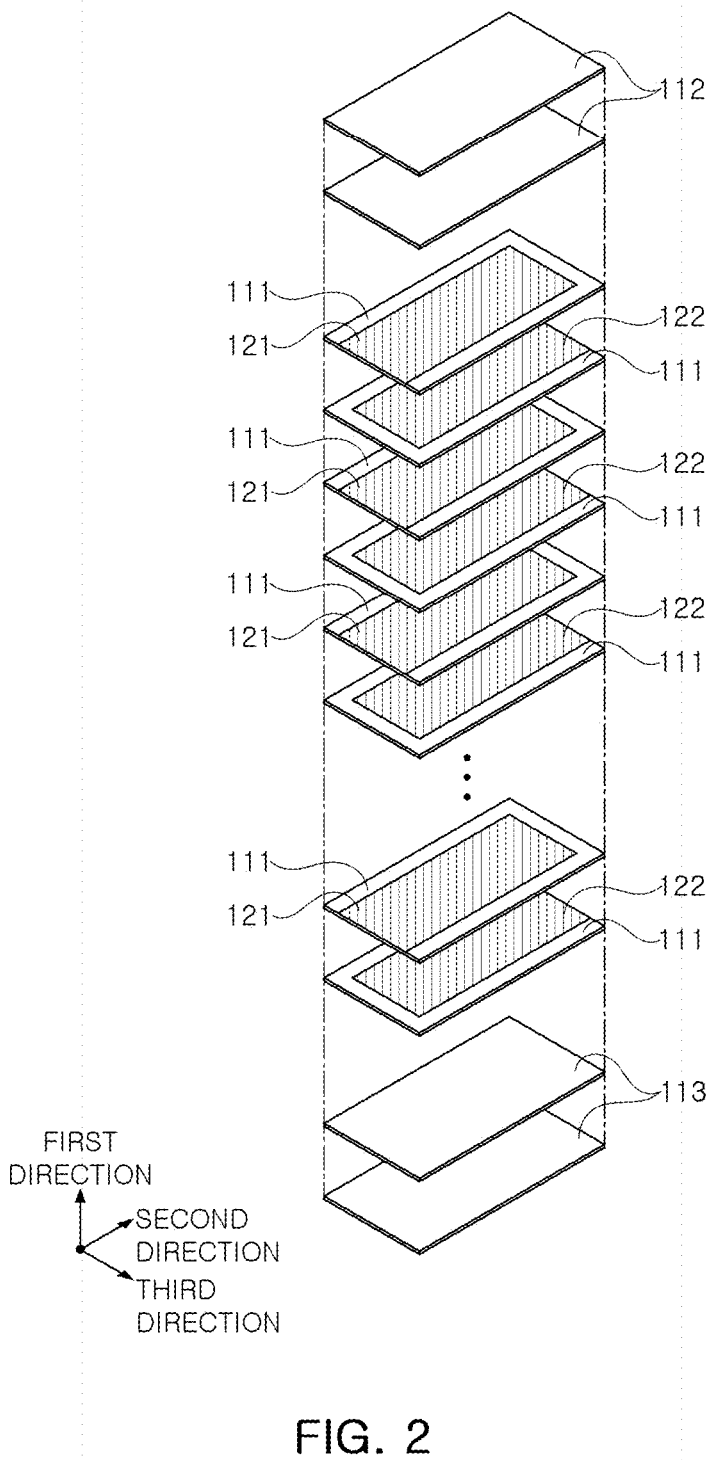
FIG. 2 schematically illustrates an exploded perspective view illustrating a stack structure of an internal electrode.

FIG. 2 schematically illustrates an exploded perspective view illustrating a stack structure of an internal electrode.

Figures 3, 4:
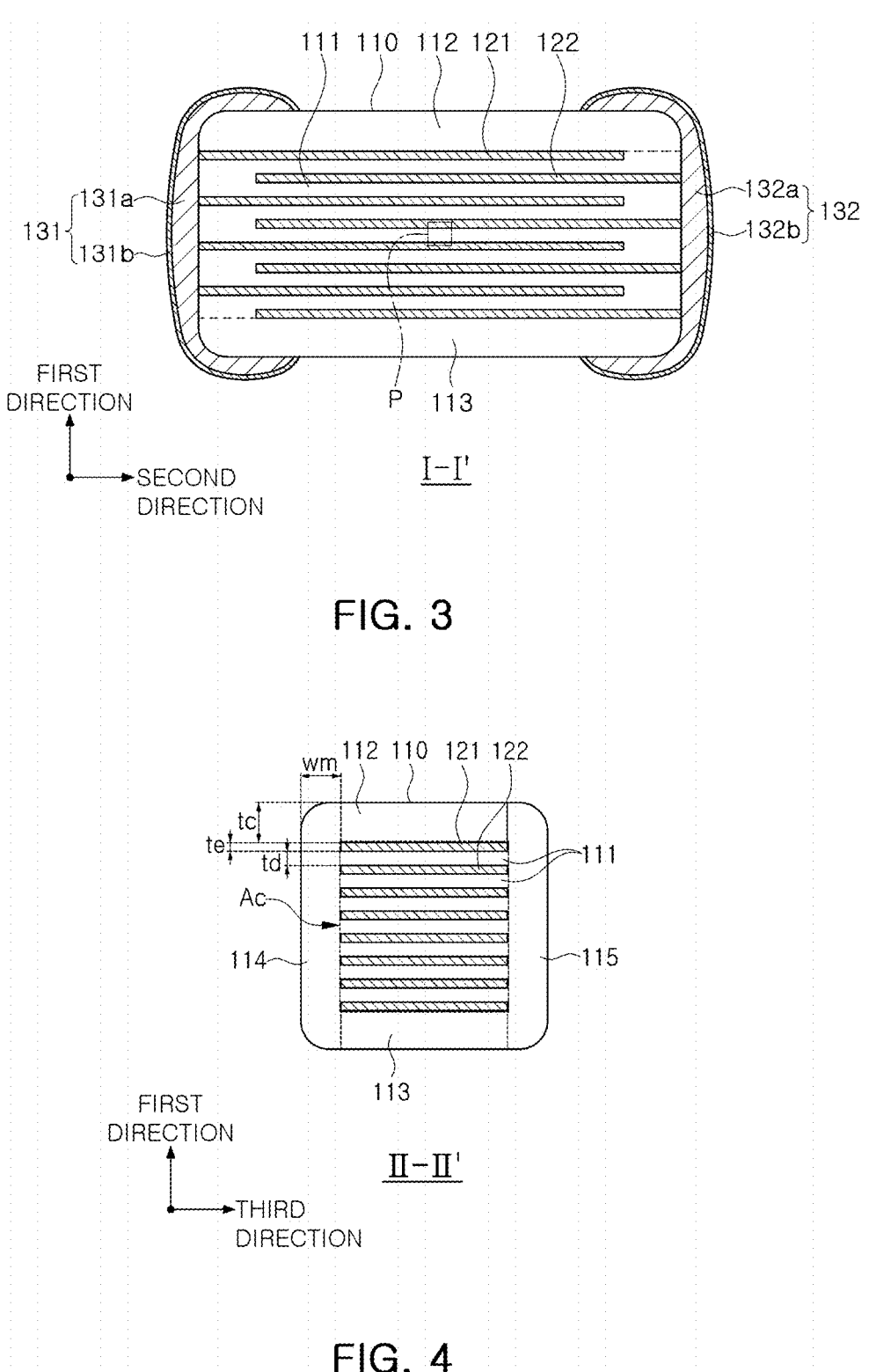
FIG. 3 schematically illustrates a cross-sectional view of FIG. 1, taken along line I-I'.
FIG. 4 schematically illustrates a cross-sectional view of FIG. 1, taken along line II-II'.

FIG. 3 schematically illustrates a cross-sectional view of FIG. 1, taken along line I-I'.

FIG. 4 schematically illustrates a cross-sectional view of FIG. 1, taken along line II-II'.

Figure 5:
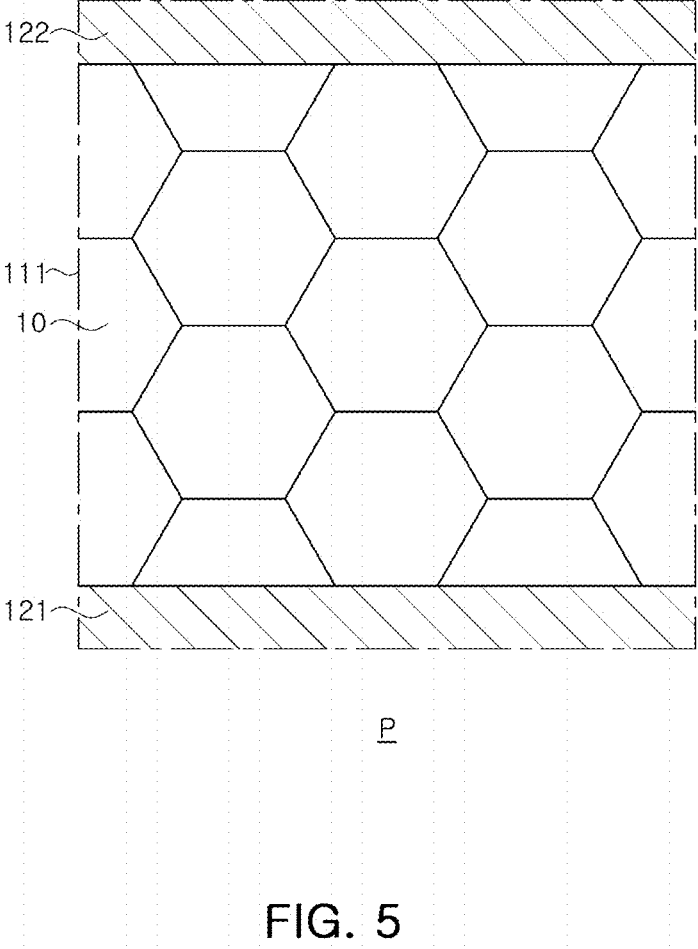
FIG. 5 schematically illustrates an enlarged view of region P in FIG. 3.

FIG. 5 schematically illustrates an enlarged view of region P in FIG. 3.

Figure 6A:
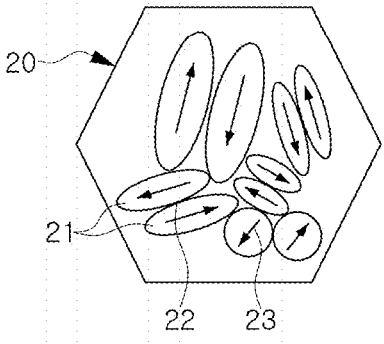
FIG. 6A schematically illustrates a dielectric grain including a nano domain, and FIG. 6B schematically illustrates a dielectric grain including a polar nano region (PNR).
Figure 6B:
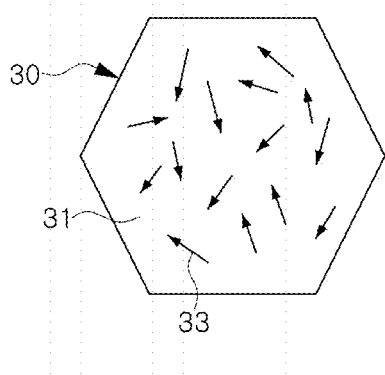

FIG. 6A schematically illustrates a dielectric grain including a nano domain, and FIG. 6B schematically illustrates a dielectric grain including a polar nano region (PNR).

Hereinafter, a multilayer electronic component according to an example embodiment of the present disclosure will be described in detail with reference to FIGS. 1 to 6B. A multilayer ceramic capacitor will be described as an example of a multilayer electronic component, but the example embodiment may also be applied to various electronic products using a dielectric composition, such as an inductor, a piezoelectric element, a varistor, a thermistor, or the like.

A multilayer electronic component 100 according to an embodiment of the present disclosure includes a body 110 including a capacitance forming portion Ac including a dielectric layer 111 including a plurality of dielectric grains 10, and internal electrodes 121 and 122 alternately disposed to be stacked with the dielectric layer 111; and external electrodes 131 and 132 disposed on the body 110, wherein the plurality of dielectric grains 10 include a first dielectric grain 20 including a nano domain having a domain region with a major diameter of 10 nm or more and less than 100 nm, and a second dielectric grain 30 including a polar nano region (PNR) having a domain region with a major diameter of less than 10 nm, wherein the number of first dielectric grains 20 included in the capacitance forming portion Ac is ND, and the number of second dielectric grains 30 included in the capacitance forming portion Ac is RD, 50%<ND/(ND+RD) may be satisfied.

In the present disclosure, a dielectric composition, dielectric grain, dielectric microstructure, dielectric layer, or multilayer electronic component with improved dielectric characteristics, as compared to the same or similar grain size by controlling a ratio of the number of domains of different sizes, may be provided.

The body 110 may have the dielectric layer 111 and the internal electrodes 121 and 122 alternately disposed to be stacked.

More specifically, the body 110 may include a capacitance forming portion Ac disposed in the body 110 and including a first internal electrode 121 and a second internal electrode 122, alternately disposed to face each other with the dielectric layer 111 interposed therebetween, to form capacitance.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

The plurality of dielectric layers 111 forming the body 110 may be in a sintered state, and a boundary between adjacent dielectric layers 111 may be integrated to such an extent that it may be difficult to identify the same without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)O_3$ $(0<y<1)$, or the like, in which calcium (Ca), zirconium (Zr), or the like is partially dissolved in $BaTiO_3$, or the like.

In addition, various ceramic additives, organic solvents, binders, dispersants, or the like may be added to the powder of barium titanate ($BaTiO_3$), and the like, as the raw material for forming the dielectric layer 111, according to the purpose of the present disclosure.

In addition, the dielectric layer 111 may be formed using a dielectric material such as barium titanate ($BaTiO_3$), and may therefore include a dielectric microstructure after sintering. The dielectric microstructure may include a plurality of dielectric grains 10, a dielectric grain boundary disposed between the adjacent dielectric grains 10, and a dielectric triple point disposed at a point at which three or more of the dielectric grain boundaries meet, wherein the plurality of dielectric grains 10, the dielectric grain boundaries, and the dielectric triple points may be plural, respectively.

In addition, the plurality of dielectric grains 10 may include a first dielectric grain 20 including a nano domain having a domain region with a major diameter of 10 nm or more and less than 100 nm, and a second dielectric grain 30 including a polar nano region (PNR) having a domain region with a major diameter of less than 10 nm. On the other hand, the second dielectric grain 30 including the polar nano region (PNR) is a domain region with a major diameter of less than 10 nm, so it may be difficult to observe the domain region, and furthermore, it may be difficult to form domain walls since arrangement of a direction of polarization is not clear, and as a result, it may be also difficult to observe the domain walls. Accordingly, in the present disclosure, when there is no domain region, that is the domain region with a size of 0 nm, will also be interpreted as a polar nano region, and the dielectric grain including the same will be explained as corresponding to the second dielectric grain 30. The plurality of dielectric grains 10 may be dielectric crystal grains.

In the present disclosure, "domain region" may refer to a certain region where the same polarization direction is gathered, and "domain wall" may refer to a region with a finite thickness in which the polarization direction changes rapidly between adjacent domain regions. "Polarization direction" may refer to a direction in which charges are arranged uniformly, and a direction from a negative charge to a positive charge based on the charge may be expressed as a polarization direction, and in general, the charge or polarization direction may be arranged in a direction when an external electric field is applied, but the present disclosure is not particularly limited thereto. "Domain size" may refer to a major diameter passing through a center of the domain area observed through a domain (polarization) measurement equipment.

The domain region may be observed through the following measurement equipment, for example, an atomic force microscope (AFM), a piezoresponse force microscope (PFM), a scanning electron microscope (SEM), a scanning transmission electron microscope (STEM), or a polarization microscope (PM), or may be observed in a measurement mode to determine the length of the major diameter, but the present disclosure is not particularly limited thereto. Other methods and/or tools appreciated by one of ordinary skill in the art, even if not described in the present disclosure, may also be used.

Meanwhile, the first and second dielectric grains 20 and 30 may include at least one domain region of one type, and a domain wall may be disposed between adjacent domain regions.

For example, the first dielectric grain 20 may include at least one nano domain 21 but not include a polar nano region 31, and the second dielectric grain 30 may include at least one polar nano region 31 but not include a nano domain 21.

In addition, the first dielectric grain 20 may include three or more different nano domains 21, include two or more domain walls 22 disposed between the adjacent nano domains 21, and at least two of the plurality of domain walls 22 may not be parallel. Alternatively, a direction of at least two major diameters of the plurality of nano domains 21 may not be parallel. The three or more different nano domains 21 may be different in terms of the polarization direction and/or the length of the major diameter.

Here, the fact that the direction of the major diameter of the domain wall or domain region is not parallel may mean that it exceeds 10°, when two domain walls are assumed to be straight lines and an angle difference between the two straight lines is calculated, and which may mean that it exceeds 10°, when the angle difference between the direction of the major diameter of the two domain regions is calculated, but the present disclosure is not limited thereto.

A polarization direction 33 of the second dielectric grain 30 may be randomly arranged, or may include a polar nano region (PNR) having a domain region having a constant polarization direction 33 arrangement, but the present disclosure is not particularly limited. When the polarization direction 33 of the second dielectric grain 30 is randomly arranged, the second dielectric grain 30 may not include a domain region, and not include a domain wall. When there is no domain region having a certain polarization direction 33 arrangement, the entire second dielectric grain 30 may be expressed as a polar nano region 31 of a domain region having polarization, but which may not correspond to a size of the domain region described in the present disclosure. That is, in the present disclosure, the size of the domain region may mean a closed area surrounded by the domain wall.

Meanwhile, when the number of first dielectric grains 20 included in the capacitance forming portion Ac is ND and the number of second dielectric grains 30 included in the capacitance forming portion Ac is RD, 50%<ND/(ND+RD) may be satisfied, and preferably, 66%<ND/(ND+RD) may be satisfied. Which may mean that the number ND of the first dielectric grains 20 is greater than the number RD of the second dielectric grains 30 included in the capacitance forming portion Ac (RD<ND), and may preferably mean that the number ND of the first dielectric grains 20 may be more than twice the number RD of the second dielectric grains 30 (2×RD<ND).

When a 0.8 μm×0.8 μm cross-sectional area of the cross-section in the first and second directions at a center of the body 110 in the third direction is observed with an atomic force microscope (AFM), for the numbers ND and RD of the first and second dielectric grains 20 and 30 included in the capacitance forming portion Ac, the number of the first dielectric grains 20 including a nano domain with a major diameter having a domain region of 10 nm or more and less than 100 nm, and the number of second dielectric grains 30 including a polar nano region (PNR) with a major diameter having a domain region of less than 10 nm is RD, so the number of the respective dielectric grains may be counted. Here, the domain region may be observed in the capacitance forming portion Ac, and may be specifically observed in the dielectric layer 111 included in the capacitance forming portion Ac, and more specifically, may be observed in the plurality of dielectric grains 10 included in the dielectric layer 111.

The number ND of the first dielectric grains 20 and the number RD of the second dielectric grains 30 may be obtained by the following method, but the present disclosure is not particularly limited thereto.

First, with respect to across-sectional area of the dielectric layer 111 in the cross-section in the second and third directions at the center of the body 110 in the first direction, the cross-sectional area is observed in a piezoresponce force microscope (PFM) analysis mode of an atomic force microscope (AFM). In this case, a voltage is applied in a direction perpendicular to the cross-sectional area, and a domain region may be measured in a direction, horizontal to the internal electrodes 121 and 122 using a certain frequency. Through this measurement method, a domain region having a polarization direction corresponding to the horizontal direction may be observed. Here, the polarization directions of the at least two observed domain regions may differ by 180°.

When observing the dielectric grains 10 by applying a constant voltage at a certain frequency using an atomic force microscope (AFM), it can be confirmed that a plurality of domain regions arranged in a certain polarization direction are observed, and the domain region with a major diameter of 10 nm or more and less than 100 nm may be viewed as a nano domain 21, and the domain region with a major diameter of less than 10 nm may be viewed as a polar nano region 31. In this case, the dielectric grain including the nano domain 21 may be referred to as a first dielectric grain 20, and the dielectric grain including the polar nano region 31 may be referred to as a second dielectric grain 30. In addition, the numbers of the first and second dielectric grains 20 and 30 classified and observed based on the above criteria can be referred to as ND and RD, respectively. Other methods and/or tools appreciated by one of ordinary skill in the art, even if not described in the present disclosure, may also be used.

As the capacitance forming portion Ac satisfies 50%<ND/(ND+RD), dielectric characteristics may be improved as compared to the size of the same or similar dielectric grains 10 and a dissipation factor (DF) may be low, and the capacitance forming portion Ac satisfies 66%<ND/(ND+RD), the dielectric characteristics may be improved as compared to the size of the same or similar dielectric grains 10, and the dielectric loss (DF) can be even lower.

When the capacitance forming portion Ac satisfies ND/(ND+RD)<50%, there is a risk that the improvement in dielectric characteristics may not be excellent as compared to the size of the same or similar dielectric grains 10.

Meanwhile, the capacitance forming portion Ac may include a plurality of nano domains 21, and a percentage of a total cross-sectional area of the plurality of nano domains 21 regions as compared to the cross-sectional area of the capacitance forming portion Ac may be 10% or more.

Here, the total cross-sectional area of the plurality of nano domains 21 may mean the sum of regions in which the nano domains 21 are observed, when the capacitance forming portion Ac is observed with equipment that can measure the domain region and that are disclosed herein. Other methods and/or tools appreciated by one of ordinary skill in the art, even if not described in the present disclosure, may also be used.

When the percentage of the total cross-sectional area of the plurality of nano domains 21 as compared to the cross-sectional area of the capacitance forming portion Ac satisfies 10% or more, dielectric characteristics may be improved as compared to the size of the same or similar dielectric grains 10.

When the percentage of the total cross-sectional area of the plurality of nano domains 21 regions as compared to the cross-sectional area of the capacitance forming portion Ac is less than 10%, there is a risk that the improvement in dielectric characteristics will not be excellent as compared to the size of the same or similar dielectric grains 10.

In an embodiment of the present disclosure, the average diameter of the plurality of dielectric grains 10 included in the dielectric layer 111 may be 100 nm or more and 300 nm or less. In this case, the plurality of dielectric grains 10 may include first and second dielectric grains 20 and 30.

As the average diameter of the plurality of dielectric grains 10 satisfies 100 nm or more and 300 nm or less, expression of the nano domain 21 may be facilitated, and the effect of improving dielectric characteristics according to a ratio of the number of the first and second dielectric grains 20 and 30 may be more excellent.

When the cross-section in the first and second directions from a center of the body 110 in the third direction using a scanning electron microscope (SEM) or an atomic force microscope (AFM), the average diameter of the plurality of dielectric grains 10 included in the dielectric layer 111 may mean an average diameter of the plurality of dielectric grains 10 observed in the corresponding region. Here, the diameter of the dielectric grain 10 may correspond to a diameter calculated through an 'Image J' program. For example, a diameter of one of the dielectric grains 10 may mean an average value of a major diameter and a minor diameter passing through a center of one of the dielectric grains 10, and after obtaining the diameter of the respective dielectric grains 10 as described above, the average diameter of the plurality of dielectric grains 10 may be obtained by averaging the diameter of the plurality of dielectric grains 10 once again, which may be referred to as an average diameter of the plurality of dielectric grains 10.

In this manner, a diameter of one of first dielectric grains 20, to be described later, or an average diameter of the plurality of first dielectric grains 20 may be obtained. Other methods and/or tools appreciated by one of ordinary skill in the art, even if not described in the present disclosure, may also be used.

Meanwhile, the plurality of dielectric grains 10 may include a plurality of first dielectric grains 20, and the average diameter of the plurality of first dielectric grains 20 may be 100 nm or more and 300 nm or less. The average diameter of the plurality of first dielectric grains 20 may be measured by scanning electron microscope (SEM) or an atomic force microscope (AFM). Other methods and/or tools appreciated by one of ordinary skill in the art, even if not described in the present disclosure, may also be used.

In this case, a percentage of a major diameter of one of the nano domains 21 compared to a diameter of one of the first dielectric grains 20 may be 26% or more. Here, the diameter of the first dielectric grain 20 and the nano domain 21 may mean the first dielectric grain 20 and one nano domain 21 included in the first dielectric grain 20 based on the first dielectric grain 20 including the nano domain 21.

More specifically, a percentage value of the major diameter passing through a center of one nano domain 21 included in the same first dielectric grain 10, compared to a diameter of the one first dielectric grain 20 may satisfy 26% or more.

As the percentage of the size of the nano domain 21 as compared to the size of the first dielectric grain 20 satisfies 26% or more, the size of the nano domain 21 having the same polarization direction 23 may be sufficient, so that the dielectric characteristics of the multilayer electronic component 100 may be improved.

A thickness td of the dielectric layer 111 does not need to be particularly limited.

However, to more easily achieve miniaturization and high capacitance of the multilayer electronic component 100, the thickness of the dielectric layer 111 may be 0.6 μm or less, more preferably 0.4 μm or less.

In this case, the thickness td of the dielectric layer 111 may mean the thickness td of the dielectric layer 111 disposed between the first and second internal electrodes 121 and 122.

Meanwhile, the thickness td of the dielectric layer 111 may mean a size of the dielectric layer 111 in the first direction. Also, the thickness td of the dielectric layer 111 may mean an average thickness td of the dielectric layer 111, and may mean an average size of the dielectric layer 111 in the first direction.

The average size of the dielectric layer 111 in the first direction may be measured by scanning images of cross-sections of the body 110 in the first and second directions with a scanning electron microscope (SEM) at a magnification of 10,000. More specifically, the average size of one dielectric layer 111 in the first direction may mean an average value calculated by measuring a size of one dielectric layer 111 in the second direction at 30 equally spaced points in the scanned image in the first direction. The thirty 30 equally spaced points may be designated in the capacitance forming portion Ac. In addition, when such an average value is measured by extensively using measurements of average values to 10 dielectric layers 111, the average size of the dielectric layers 111 in the first direction may be further generalized. Other methods and/or tools appreciated by one of ordinary skill in the art, even if not described in the present disclosure, may also be used.

The internal electrodes 121 and 122 may be alternately disposed to be stacked with the dielectric layer 111.

The internal electrodes 121 and 122 may include a first internal electrode 121 and a second internal electrode 122, and the first and second internal electrodes 121 and 122 may be alternately disposed to oppose each other with the dielectric layers 111, constituting the body 110, interposed therebetween, and may be exposed from the third and fourth surfaces 3 and 4 of the body 110, respectively.

More specifically, the first internal electrode 121 may be spaced apart from the fourth surface 4, and may be exposed from the third surface 3, and the second internal electrode 122 may be spaced apart from the third surface 3, and may be exposed from the fourth surface 4. A first external electrode 131 may be disposed on the third surface 3 of the body 110 to be connected to the first internal electrode 121, and a second external electrode 132 may be disposed on the fourth surface 4 of the body 110 to be connected to the second internal electrode 122.

That is, the first internal electrode 121 may not be connected to the second external electrode 132, but may be connected to the first external electrode 131, and the second internal electrode 122 may not be connected to the first external electrode 131, but may be connected to the second external electrode 132. In this case, the first and second internal electrodes 121 and 122 may be electrically separated from each other by the dielectric layer 111 interposed therebetween.

Meanwhile, the body 110 may be formed by alternately stacking a ceramic green sheet on which the first internal electrode 121 is printed and a ceramic green sheet on which the second internal electrode 122 is printed, and then sintering the stacked ceramic green sheets.

A material for forming the internal electrodes 121 and 122 not particularly limited, and a material having excellent electrical conductivity may be used. For example, the internal electrodes 121 and 122 may include nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-print-ing method, a gravure printing method, or the like may be used, but the present disclosure is not limited thereto.

Meanwhile, a thickness te of the internal electrodes 121 and 122 does not need to be particularly limited.

However, to more easily achieve miniaturization and high capacitance of the multilayer electronic component, the thickness of the internal electrodes 121 and 122 may be 0.6 μm or less, more preferably 0.4 μm or less.

In this case, the thickness te of the internal electrodes 121 and 122 may mean a size of the internal electrodes 121 and 122 in the first direction. In addition, the thickness te of the internal electrodes 121 and 122 may mean an average thickness te of the internal electrodes 121 and 122, and may mean an average size of the internal electrodes 121 and 122 in the first direction.

The average size of the internal electrodes 121 and 122 in the first direction may be measured by scanning images of cross-sections of the body 110 in the first and second directions with a scanning electron microscope (SEM) at a magnification of 10,000. More specifically, the average size of one internal electrode in the first direction may be an average value calculated by measuring a size of one internal electrode in the second direction at 30 equally spaced points in the scanned image. The 30 equally spaced points may be designated in the capacitance forming portion Ac. In addition, when such an average value is determined by extensively using measurements of average values to 10 internal electrodes 121 and 122, the average size of the internal electrodes 121 and 122 in the first direction may be further generalized.

Meanwhile, the body 110 may include cover portions 112 and 113 disposed on both end-surfaces of the capacitance forming portion Ac in the first direction.

Specifically, the cover portions 112 and 113 may include a first cover portion 112 disposed on one surface of the capacitance forming portion Ac in the first direction and a second cover portion 113 disposed on the other surface of the capacitance forming portion Ac in the first direction, and more specifically, the cover portions 112 and 113 may include an upper cover portion 112 disposed above the capacitance forming portion Ac in the first direction, and a lower cover portion 113 disposed below the capacitance forming portion Ac in the first direction.

The upper cover portion 112 and the lower cover portion 113 may be formed by stacking a single dielectric layer 111 or two or more dielectric layers 111 on upper and lower surfaces of the capacitance forming portion Ac in the first direction, respectively, and may basically play a role in preventing damage to the internal electrodes 121 and 122 due to physical or chemical stress.

The upper cover portion 112 and the lower cover portion 113 may not include the internal electrodes 121 and 122, and may include the same material as the dielectric layer 111. For example, the upper cover portion 112 and the lower cover portion 113 may include a ceramic material, and may include, for example, a barium titanate ($BaTiO_3$)-based ceramic material.

Meanwhile, a thickness tc of the cover portions 112 and 113 not need to be particularly limited.

However, to more easily achieve miniaturization and high capacitance of the multilayer electronic component, the thickness tc of the cover portions 112 and 113 may be 100 μm or less, preferably 30 μm or less, and, in case of ultra-small products, more preferably 20 μm or less.

In this case, the thickness tc of the cover portions 112 and 113 may mean a size of the cover portions 112 and 113 in the first direction. In addition, the thickness tc of the cover portions 112 and 113 may mean an average thickness tc of the cover portions 112 and 113, and may mean an average size of the cover portion 112 and 113 in the first direction.

The average size of the cover portions 112 and 113 in the first direction may be measured by scanning images of cross-sections of the body 110 in the first and second directions with a scanning electron microscope (SEM) at a magnification of 10,000. More specifically, the average size in the first direction may be an average value calculated by measuring the size in the first direction at 30 equally spaced points in the second direction in the scanned image of one cover portion.

In addition, the average size of the cover portions 112 and 113 in the first direction measured by the above-described method may be substantially the same as the average size of the cover portions 112 and 113 in the first direction, in cross-sections of the body 110 in the first and third directions.

Meanwhile, side margin portions 114 and 115 may be disposed on both end-surfaces of the body 110 in the third direction.

More specifically, the side margin portions 114 and 115 may include a first side margin portion 114 disposed on the fifth surface 5 of the body 110, and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to regions between both ends of the first and second internal electrodes 121 and 122 in the third direction and a boundary surface of the body 110, based on a cross-section of the body 110 cut in the first and third directions.

The side margin portions 114 and 115 may basically play a role in preventing damage to the internal electrodes 121 and 122 due to physical or chemical stress.

The side margin portions 114 and 115 may be formed by applying a conductive paste on a ceramic green sheet to form the internal electrodes 121 and 122, except for a portion in which the side margin portions 114 and 115 are formed, and, to suppress a step difference due to the internal electrodes 121 and 122, cutting the internal electrodes 121 and 122 to expose the fifth and sixth surfaces 5 and 6 of the body 110, and then stacking a single dielectric layer 111 or two or more dielectric layers 111 in the third direction on both end-surfaces of the capacitance forming portion Ac in the third direction.

The first side margin portion 114 and the second side margin portion 115 may not include the internal electrodes 121 and 122, and may include the same material as the dielectric layer 111. For example, the first side margin portion 114 and the second side margin portion 115 may include a ceramic material, and may include, for example, a barium titanate ($BaTiO_3$)-based ceramic material.

Meanwhile, a width wm of the first and second side margin portions 114 and 115 does not need to be particularly limited.

However, to more easily achieve miniaturization and high capacitance of the multilayer electronic component 100, the width wm of the first and second side margin portions 114 and 115 may be 100 μm or less, and preferably 30 μm or less, and, in case of ultra-small products, more preferably 20 μm or less.

In this case, the width wm of each of the side margin portions 114 and 115 may mean a size of each of the side margin portions 114 and 115 in the third direction. Also, the width wm of each of the side margin portions 114 and 115 may mean an average width wm of each of the side margin portions 114 and 115, and may mean an average size of each of the side margin portions 114 and 115 in the third direction.

The average size of each of the side margin portions 114 and 115 in the third direction may be measured by scanning images of cross-sections of the body 110 in the first and third directions with a scanning electron microscope (SEM) at a magnification of 10,000. More specifically, the average size in the third direction may refer to an average value calculated by measuring sizes in the third direction at 10 equally spaced points in the first direction in a scanned image of one side margin portion.

In an embodiment of the present disclosure, a structure in which the multilayer electronic component 100 has two external electrodes 131 and 132 is illustrated, but the number, shapes, or the like of the external electrodes 131 and 132 may be changed, depending on a shape of the internal electrodes 121 and 122, or other purposes.

The external electrodes 131 and 132 may be disposed on the body 110 and connected to the internal electrodes 121 and 122.

More specifically, the external electrodes 131 and 132 may include first and second external electrodes 131 and 132 respectively disposed on the third and fourth surfaces 3 and 4 of the body 110, and respectively connected to the first and second internal electrodes 121 and 122. That is, the first external electrode 131 may be disposed on the third surface 3 of the body to be connected to the first internal electrode 121, and the second external electrode 132 may be disposed on the fourth surface 4 of the body to be connected to the second internal electrode 122.

Additionally, the external electrodes 131 and 132 may be disposed to extend on portions of the first and second surfaces 1 and 2 of the body 110, or may be disposed to extend on portions of the fifth and sixth surfaces 5 and 6 of the body 110. That is, the first external electrode 131 may be disposed on portions of the first, second, fifth, and sixth surfaces 1, 2, 5, and 6 of the body 110, and on the third surface 3 of the body 110, and the second external electrode 132 may be disposed on portions of the first, second, fifth, and sixth surfaces 1, 2, 5, and 6 of the body 110, and on the third surface 3 of the body 110.

The external electrodes 131 and 132 may be formed of any material as long as they have electrical conductivity, such as metal or the like, and a specific material may be determined in consideration of electrical characteristics, structural stability, or the like, and may further have a multilayer structure.

For example, the external electrodes 131 and 132 may include electrode layers 131*a* and 132*a* disposed on the body 110, and plating layers 131*b* and 132*b* disposed on the electrode layers 131*a* and 132*a*.

As a more specific example of the electrode layers 131*a* and 132*a*, the electrode layers 131*a* and 132*a* may be sintered electrodes including a conductive metal and glass or resin-based electrodes including a conductive metal and a resin.

In addition, the electrode layers 131*a* and 132*a* may have a form in which the sintered electrode and the resin-based electrode are sequentially formed on the body 110.

In addition, the electrode layers 131*a* and 132*a* may be formed by transferring a sheet containing the conductive metal onto the body 110, or may be formed by transferring a sheet containing the conductive metal onto the sintered electrode.

As the conductive metal used for the electrode layers 131*a* and 132*a*, a material that may be electrically connected to the internal electrodes 121 and 122 to form capacitance may be used, but is not particularly limited thereto. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof. The electrode layers 131*a* and 132*a* may be formed by applying a conductive paste prepared by adding glass frit to a conductive metal powder and then sintering the same.

The plating layers 131*b* and 132*b* may serve to improve mounting characteristics.

A type of the plating layers 131*b* and 132*b* is not particularly limited, may be provided as a single plating layer (131*b* and 132*b*) containing at least one of nickel (Ni), tin (Sn), palladium (Pd), or an alloy thereof, and may be formed as a plurality of layers.

For a more specific example of the plating layers 131*b* and 132*b*, the plating layers 131*b* and 132*b* may be an Ni plating layer or an Sn plating layer, and the Ni plating layer and the Sn plating layer may be sequentially formed on the electrode layers 131*a* and 132*a*. The Sn plating layer, the Ni plating layer, and the Sn plating layer may be sequentially formed. In addition, the plating layers 131*b* and 132*b* may include a plurality of Ni plating layers and/or a plurality of Sn plating layers.

A size of the multilayer electronic component 100 is not particularly limited.

However, in order to achieve miniaturization and high capacitance at the same time, the thickness of the dielectric layer and internal electrodes should be thinned to increase the number of stack layers thereof, so that an effect according to the present disclosure may be more remarkable in a multilayer electronic component 100 having a size of 1005 (length×width: 1.0 mm×0.5 mm, and length and width error change: within ±5%), and 0603 (length×width: 0.6 mm×0.3 and length and width error change: within ±5%). The size of the multilayer electronic component 100 may be measured by an optical microscope. Other methods and/or tools appreciated by one of ordinary skill in the art, even if not described in the present disclosure, may also be used.

Hereinafter, the present disclosure will be described in more detail through test examples, but this is intended to aid specific understanding of the disclosure and the scope of the present disclosure is not limited by the test examples.

(Test Example)

The present disclosure will be described in more detail using Comparative Example 1 and Example 1 as an example, but the scope of the present disclosure is not particularly limited thereto.

502 dielectric grains were measured in a region in which the dielectric layer of Comparative Example 1 was observed at 70,000 times magnification through a scanning electron microscope (SEM). A minimum value of a diameter of one dielectric grain was measured to be 27.6 nm, a maximum value of the diameter was 499.5 nm, an average value of the diameter was 184 nm, and sample deviation (STDEV) of the diameter was 82.4.

545 dielectric grains were measured in a region in which the dielectric layer of Example 1 was observed at 70,000 times magnification through a scanning electron microscope (SEM). The minimum value of the diameter of one dielectric grain was 40.0 nm, the maximum value of the diameter was 538.4 nm, the average value of the diameter was 179 nm, and the sample deviation (STDEV) of the diameter was measured to be 79.1.

When compared to Comparative Example 1, the average size of the plurality of dielectric grains in Example 1 was reduced by about 3%, and this figure may arguably correspond to a level of comparable size when considering an error range.

Hereinafter, a method for measuring a domain region for Comparative Example 1 and Example 1 will be described. First, with respect to a 0.8 μm×0.8 μm cross-sectional area of the dielectric layer 111 in the second and third direction cross-sections from the center of the body 110 in the first direction of Comparative Example 1 and Example 1, voltage is applied in a piezoelectric force microscope (PFM) analysis mode of an atomic force microscope (AFM). In this case, Multi75E-G was used as a probe (cantilever), and a voltage of 1V drive amplitude was applied in a direction perpendicular to the cross-sectional area. A measurement direction of the domain region was measured in a direction parallel to an Ni electrode using a frequency of 650 kHz in a lateral PFM mode. Through this measurement method, it was possible to measure the domain region corresponding to the horizontal direction to the Ni electrode. Here, a polarization direction of at least two observed domain regions may differ by 180°.

In the piezoelectric force microscope (PFM) analysis mode, information about the domain region and domain wall distribution of the sample may be confirmed with amplitude information, and information about the polarization direction can be confirmed with phase information.

Figure 7A:
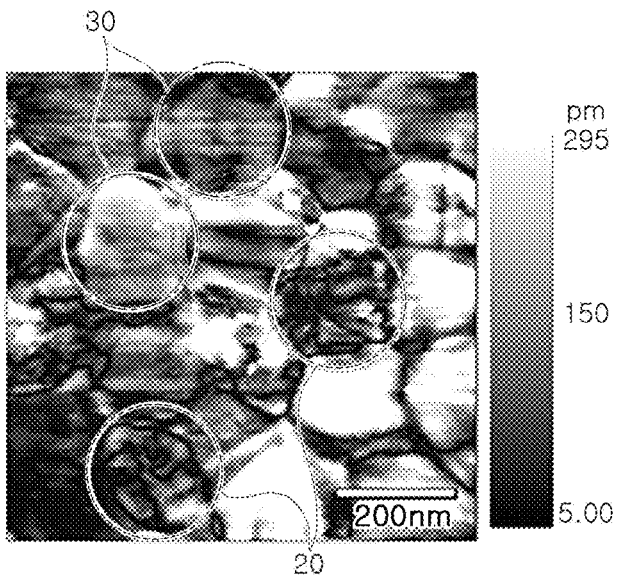
FIG. 7A is an image of a domain region, measured using an AFM measurement device when an electric field was applied to a dielectric microstructure of a Comparative Example.

More specifically, as can be seen in FIG. 7A, which is an image observed with amplitude information in the piezoelectric force microscope (PFM) analysis mode for Comparative Example 1, a first dielectric grain 20 including a plurality of nano domains within the 0.8 μm×0.8 μm cross-sectional area of the dielectric layer and a second dielectric grain 30 including a polar nano region may be observed, and it can be confirmed that the number RD of the second dielectric grains 30 is greater than the number ND of the first dielectric grains 20 (ND<RD) (ND<RD). In this case, an average major diameter of the observed plurality of nano domains 21 was measured to be 70 nm or more and 80 nm or less.

Figure 7B:
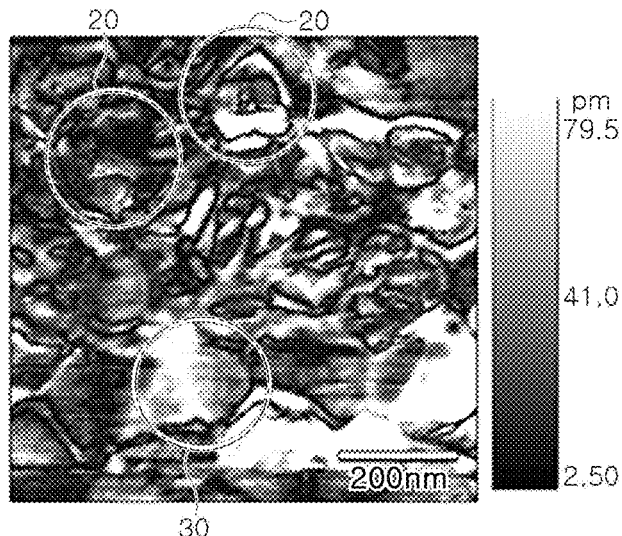
FIG. 7B is an image of a domain region, measured using an AFM measurement device when an electric field was applied to a dielectric microstructure of an Example.

In addition, as can be seen in FIG. 7B, which is an image observed with amplitude information in the piezoelectric force microscope (PFM) analysis mode for Example 1, a first dielectric grain 20 including a plurality of nano domains within the 0.8 μm×0.8 μm cross-sectional area of the dielectric layer and a second dielectric grain 30 including a polar nano region may be observed, and it can be confirmed that the number ND of the first dielectric grains 20 is greater than the number RD of the second dielectric grains 30 (RD<ND). In this case, an average major diameter of the observed plurality of nano domains 21 was measured to be 80 nm or more and 100 nm or less.

Figure 8A:
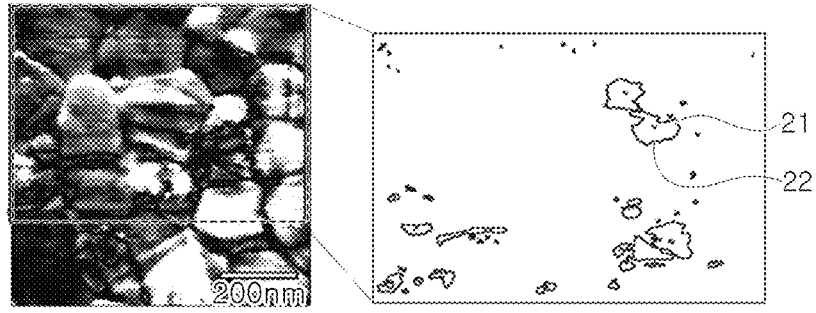
FIG. 8A is a program diagram of a nano domain region when an electric field was applied to a dielectric microstructure of a Comparative Example.

Meanwhile, in FIG. 8A, an image observed with phase information in the piezoelectric force microscope (PFM) analysis mode for the same region as in FIG. 7A, for Comparative Example 1, is depicted as a nano domain 21 and a domain wall of the nano domain, the domain wall 22 of the nano domain corresponds to what is expressed as a line, and the nano domain 21 corresponds to a closed region surrounded by the domain wall 22 of the nano domain. An area percentage of the nano domains 21 among the regions depicted by the program in FIG. 8A was observed to be about 3%.

Figure 8B:
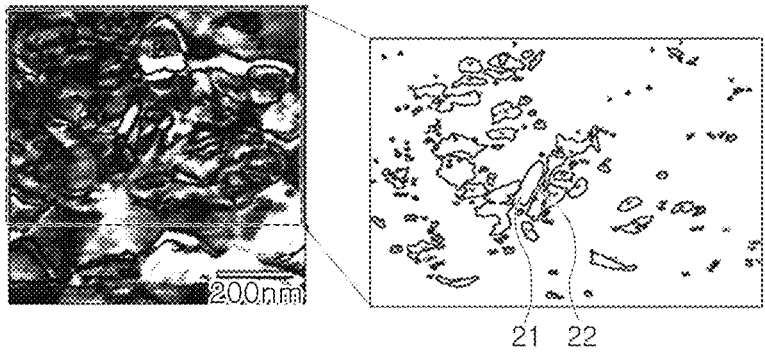
FIG. 8B is a program diagram of a nano domain region when an electric field was applied to a dielectric microstructure of an Example.

In FIG. 8B, an image observed with phase information in the piezoelectric force microscope (PFM) analysis mode for the same region as in FIG. 7B, which is Example 1, is depicted as a nano domain 21 and a domain wall of the nano domain, the domain wall 22 of the nano domain corresponds to what is expressed as a line, and the nano domain 21 corresponds to a closed region surrounded by the domain wall 22 of the nano domain. An area percentage of the nano domains 21 among the regions depicted by the program in FIG. 8B was observed to be about 11%.

When the dielectric capacitance was measured for Comparative Example 1 and Example 1, it was confirmed that the dielectric capacitance of Example 1 increased by 6% compared to Comparative Example 1.

Therefrom, in dielectric grains of similar size, the number ND of the first dielectric grains 20 included in the capacitance forming portion Ac is greater than the number RD of the second dielectric grains 30 included in the capacitance forming portion Ac (RD<ND), it can be confirmed that the dielectric capacitance is improved.

In addition, it can be interpreted that the larger the region of the nano domain 21 among the observed regions of the dielectric layer 111, the greater the number of nano domains 21 ND, and accordingly, it can be interpreted that the number of domain walls 22 of the nano domain increases, and it may be predicted that dielectric characteristics may be improved thereby.

Next, [Table 1] shows the number ND of the first dielectric grains 20 and the number RD of the second dielectric grains 30 in Comparative Examples 2 to 3 and Examples 2 to 4. ND and RD were observed using the method described above, a ratio therebetween was calculated, and it was expressed as a percentage, and dielectric capacitance (nF) for each test example was measured and then described. In this case, the dielectric capacitance was measured using an LCR meter.

An average diameter of the plurality of dielectric grains in Comparative Examples 2 to 3 and Examples 2 to 4 was 100 nm or more and 300 nm or less, which was confirmed to have dielectric grains of similar sizes within an error tolerance range.

TABLE 1

| Test example | First dielectric grain (%) | Second dielectric grain (%) | Dielectric capacitance (nF) |
|---|---|---|---|
| Comparative Example 2 | 43% | 57% | 418 |
| Comparative Example 3 | 50% | 50% | 444 |
| Example 2 | 51% | 49% | 464 |
| Example 3 | 67% | 33% | 475 |
| Example 4 | 70% | 30% | 489 |

In Comparative Examples 2 to 3, it was confirmed that the number of first dielectric grains ND was less than or equal to the number of second dielectric grains RD (ND<RD), and the dielectric capacitance did not exceed 450 nF. On the other hand, in Examples 3 to 4, it was confirmed that the number of first dielectric grains ND was greater than the number of second dielectric grains RD and the dielectric capacitance exceeded 450 nF. More specifically, it can be confirmed that Example 2 has a ratio of first dielectric grains of 51% and Comparative Example 3 has a ratio of first dielectric grains of 50%, while the dielectric capacitance of Example 2 is increased by about 5% as compared to the dielectric capacitance of Comparative Example 3.

Therefrom, it can be seen that when the number of first dielectric grains ND is greater than the number of second dielectric grains RD (RD<ND) when the dielectric grain size is similar, the dielectric capacitance is improved.

Next, in [Table 2] the dielectric loss (DF) of Comparative Example 2 and Example 4 described above was measured and described.

The dielectric loss (DF) was measured by maintaining room temperature capacitance of the sample chips of Comparative Example 2 and Example 4 at 1 kHz and 1 Vr for 60 seconds using an LCR meter.

TABLE 2

| Dielectric loss | Comparative Example 2 | Example 4 |
|---|---|---|
| Average value(%) | 4.5 | 4.0 |
| Maximum value(%) | 5.5 | 4.8 |
| Minimum value(%) | 4.0 | 2.3 |
| Sample deviation(STDEV) | 0.2 | 0.4 |

It was confirmed that an average dielectric loss value of Example 4 was implemented to be lower by about 0.5% as compared to an average dielectric loss value of Comparative Example 2, and therefrom, it was confirmed that dielectric loss characteristics were improved.

From this, when the number ND of the first dielectric grains included in the capacitance forming portion is greater than the number RD of the second dielectric grains included in the capacitance forming portion, more specifically, when the number of the first dielectric grains included in the capacitance forming portion and the number of second dielectric grains included therein differ by 40%, it can be confirmed that the dielectric loss is improved.

Next, dielectric capacitance (F) according to DC-bias voltage was measured for Comparative Example 2 and Example 4. For the samples of Comparative Example 2 and Example 4, AC 1 kHz, 1 Vr conditions were applied for 60 seconds using an LCR meter, and dielectric capacitance was measured each time the voltage was increased by 1 V. The voltage was increased from 0 V to 10 V, and it can be confirmed by FIG. 9 that the dielectric capacitance changes based on the dielectric capacitance value at 0 V.

Figure 9:
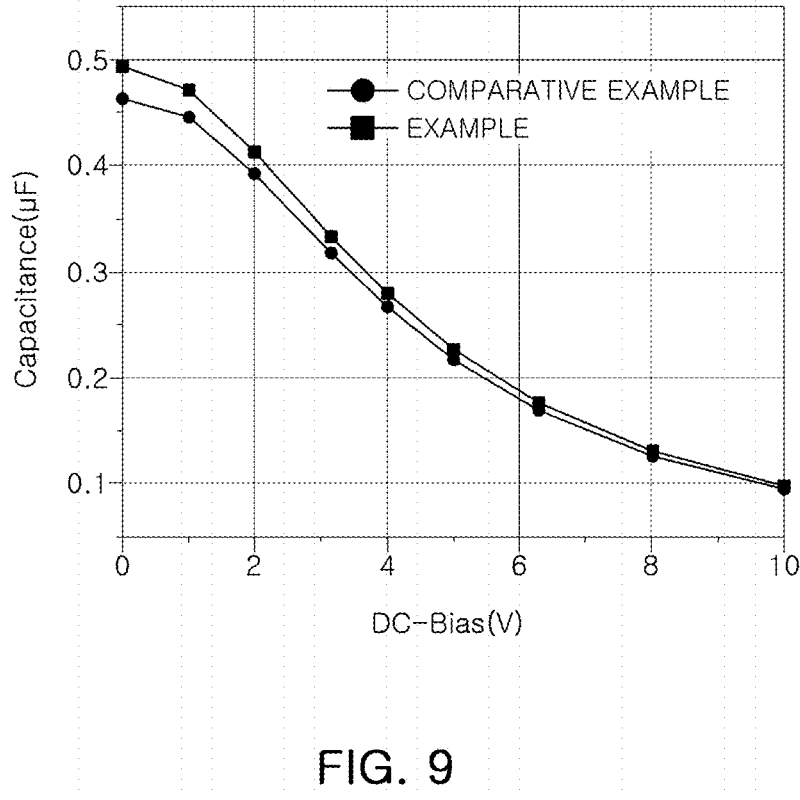
FIG. 9 is a graph illustrating dielectric capacitance according to a voltage in a Comparative Example and an Example.

Here, FIG. 9 is a graph illustrating dielectric capacitance (F) according to a DC-bias voltage (V) of Comparative Example 2 and Example 4.

In particular, it can be confirmed that Comparative Example 2 and Example 4 have a large difference in dielectric capacitance under low voltage conditions of 4V or less. This means that at high voltages exceeding 4V, an electric field, which is a voltage per unit thickness of the dielectric layer (V/μm) due to the external voltage, becomes stronger, making it easier to align the polarization direction in the electric field direction, showing similar domain characteristics, so it is predicted that a difference in the impact in which the dielectric characteristics by the domain is reduced.

From this, when the number ND of the first dielectric grains included in the capacitance forming portion under low voltage is greater than the number RD of the second dielectric grains included in the capacitance forming portion, more specifically, when the number ND of the first dielectric grains included in the capacitance forming portion and the number RD of the second dielectric grains included therein differ by 40%, it can be confirmed that the dielectric capacitance is improved.

Hereinafter, a method of manufacturing a multilayer electronic component will be described, using a multilayer ceramic capacitor as an example, but the present disclosure is not particularly limited thereto. In addition, in the description of the method for manufacturing a multilayer electronic component according to an embodiment of the present disclosure, description overlapping the above-described multilayer electronic component will be omitted.

According to an aspect of the present disclosure, a method for manufacturing a multilayer electronic component, the method may include: preparing a slurry containing dielectric powder, a solvent, a dispersant, and a binder and preparing a ceramic green sheet using the slurry; preparing a stack body by printing and laminating a conductive paste for internal electrodes on the ceramic green sheet; preparing a body including a capacitance forming portion including a dielectric layer including a plurality of dielectric grains and an internal electrode alternately disposed to be stacked with the dielectric layer by sintering the stack body; and preparing an external electrode on the body, wherein the plurality of dielectric grains may include a first dielectric grain including a nano domain having a domain region with a size of 10 nm to 100 nm, and a second dielectric grain including a polar nano region having a domain region with a size of less than 10 nm, and when the number of the first dielectric grains included in the capacitance forming portion is ND, and the number of the second dielectric grains included in the capacitance forming portion is RD, 50%<ND/(ND+RD) is satisfied.

First, a slurry containing dielectric powder, a solvent, a dispersant, and a binder may be prepared, and a ceramic green sheet may be prepared using the slurry.

The dielectric powder may be a perovskite (ABO$_3$)-based material, for example, a barium titanate-based material, a lead composite perovskite-based material, a strontium titanate-based material, or the like. The barium titanate-based material may include a BaTiO$_3$-based ceramic powder, and examples of the ceramic powder may include BaTiO$_3$, or (Ba$_{1-x}$Ca$_x$)TiO$_3$ (0<x<1), Ba(Ti$_{1-y}$Ca$_y$)O$_3$ (0<y<1), (Ba$_{1-x}$Ca$_x$)(Ti$_{1-y}$Zr$_y$)O$_3$ (0<x<1, 0<y<1), Ba(Ti$_{1-y}$Zr$_y$)O$_3$ (0<y<1), or the like, in which calcium (Ca), zirconium (Zr), or the like is partially dissolved in BaTiO$_3$, or the like.

An average diameter of the dielectric powder may be 50 nm or more and 300 nm or less. The dielectric powder may be composed of a plurality of dielectric particles, and the diameter of the dielectric particle may be obtained by averaging a major diameter and a minor diameter of the dielectric particle, and the average diameter of the plurality of dielectric particles may be referred to as an average diameter of the dielectric powder, but the present disclosure is not particularly limited thereto.

When the average diameter of the dielectric powder is 50 nm or more and 300 nm or less, it may be easy to express nano domains 21 after sintering, and the effect of improving dielectric characteristics according to a ratio of the number of the first and second dielectric grains 20 and 30 may be excellent.

The solvent, dispersant, and binder may be any commonly used material and the material is not particularly limited.

Then, the prepared slurry may be applied on a carrier film to prepare a ceramic green sheet with a certain thickness.

Next, a step of preparing a stack body may be performed by printing and stacking a conductive paste for internal electrodes on the ceramic green sheet.

The conductive paste may include a conductive metal. The conductive metal is not particularly limited, but a material with excellent electrical conductivity, such as the internal electrode described above, may be used.

More specifically, an internal electrode pattern may be formed by printing the conductive paste for internal electrodes at a predetermined interval on a ceramic green sheet. For example, a plurality of stripe-shaped first internal electrode patterns may be formed. The plurality of stripe-shaped first internal electrode patterns may be formed to be parallel to each other, and a ceramic green sheet on which the first internal electrode pattern is formed may be defined as a first ceramic green sheet. In addition, a plurality of stripe-shaped second internal electrode patterns may be formed on another ceramic green sheet at a predetermined interval, and the ceramic green sheet on which the second internal electrode pattern is formed may be defined as a second ceramic green sheet.

The internal electrode pattern may be formed by applying the paste for internal electrodes on a ceramic green sheet using a screen printing method or a gravure printing method, but the present disclosure is not limited thereto.

A step of forming a stack body may be performed by stacking and cutting a plurality of ceramic green sheets on which a plurality of internal electrode patterns are formed.

More specifically, a plurality of stripe-shaped first internal electrode patterns are formed at a predetermined interval on the ceramic green sheet. The plurality of stripe-shaped first internal electrode patterns may be formed to be parallel to each other, and the ceramic green sheet on which the first internal electrode pattern is formed may be defined as a first ceramic green sheet. In addition, a plurality of stripe-shaped second internal electrode patterns may be formed on another ceramic green sheet at a predetermined interval, and the ceramic green sheet on which the second internal electrode pattern is formed may be defined as a second ceramic green sheet.

In this case, a portion in which the ceramic green sheet and the internal electrode pattern are stacked in the first direction to form capacitance may be defined as a capacitance forming portion, and a cover green sheet may be disposed on both end surfaces of the capacitance forming portion in the first direction. More specifically, the cover green sheet may include a first cover green sheet disposed above the capacitance forming portion in the first direction and a second cover green sheet disposed below the capacitance forming portion in the first direction.

A first ceramic green sheet on which the plurality of parallel stripe-shaped first internal electrode patterns is printed and a second ceramic green sheet on which the plurality of parallel stripe-shaped second internal electrode patterns are printed may be alternately disposed to be stacked, to form a ceramic green sheet stack body.

The ceramic green sheet laminate body may be cut to cross the plurality of stripe-shaped first internal electrode patterns and the plurality of stripe-shaped second internal electrode patterns. That is, the ceramic green sheet stack body may be a stack body cut along cutting lines, orthogonal to each other.

Next, a side margin green sheet may be formed on a side surface of the stack body in a third direction.

More specifically, a first side margin green sheet may be formed on one side of the stack body in the third direction, for example, on the third surface thereof, and a second side margin green sheet may be formed on the other side of the stack body in the third direction, for example, on the fourth surface thereof.

Next, a step may be performed to prepare a body including a capacitance forming portion including a dielectric layer including a plurality of dielectric grains and an internal electrode alternately disposed to be stacked with the dielectric layer by sintering the stack body.

Through the sintering process, the stripe-shaped first internal electrode pattern may be the first internal electrode 121, and the stripe-shaped second internal electrode pattern may be the second internal electrode 122. In addition, the first cover green sheet may be the first cover portion 112, and the second cover green sheet may be the second cover portion 113. The first side margin green sheet may be the first side margin portion 114, and the second side margin green sheet may become the second side margin portion 115.

Next, a step of applying a paste for external electrodes on the body and sintering the same to prepare external electrodes 132 and 132 may be included.

More specifically, a first external electrode 131 and a second external electrode 132 may be formed by applying a first external electrode to one surface of the stack body in the second direction, for example, to the third surface 3 thereof, and applying a second external electrode to the other surface of the stack body in the second direction, for example, to the fourth surface 4 thereof and then sintering the first and second external electrode pastes.

In addition, a plating process may be additionally performed so that the external electrodes 131 and 132 include plating layers 131b and 132b.

A description regarding the external electrodes 131 and 132 are the same as described above and will therefore be omitted.

Meanwhile, the capacitance forming portion of the sintered body may include a plurality of dielectric grains, and the plurality of dielectric grains may include a first dielectric grain including a nano domain, which is a domain region having a size of 10 nm or more and less than 100 nm and a second dielectric grain including a polar nano region, which is a domain region having a size of less than 10 nm, wherein, when the number of the first dielectric grains included in the capacitance forming portion is ND and the number of the second dielectric grains included in the capacitance forming portion is RD, 50%<ND/(ND+RD) may be satisfied.

The description regarding this is the same as that described for the above-described multilayer electronic component 100 and will therefore be omitted.

Meanwhile, in the step of sintering the stack body, sintering conditions may be as follows.

When sintering a stack body, sintering may be performed in a reducing atmosphere with a hydrogen concentration of less than 0.5%. Here, a hydrogen concentration of less than 0.5% may correspond to a condition of EMF of less than 760 mV.

When sintering is performed in a reducing atmosphere with a hydrogen concentration of less than 0.5%, the formation of the first dielectric grains 20 including the nano domains 21 may be easily formed, and it may be easy to control the expression of the first dielectric grains 20 and the second dielectric grains 30. Accordingly, it may be easy to control so that a ratio of the number ND of the first dielectric grains 20 included in the capacitance forming portion AC and the number RD of the second dielectric grains 30 included in the capacitance forming portion Ac satisfy 50%<ND/(ND+RD).

The sintering may be performed at the sintering temperature within a range of, for example, 1150° C. or higher and 1300° C. or lower, and may preferably be performed at a temperature of 1200° C. or higher and 1250° C. or lower, but the present disclosure is not particularly limited thereto.

As set forth above, according to one of many effects of the present disclosure, dielectric characteristics of a multilayer electronic component may be improved.

According to one of many effects of the present disclosure, dielectric characteristics of a multilayer electronic component, as compared to a dielectric layer of the same size or a dielectric grain of the same size may be improved.

According to one of many effects of the present disclosure, dielectric characteristics of a multilayer electronic component may be improved by controlling a microstructure of a domain structure of the dielectric grain.

However, various advantages and effects of the present disclosure are not limited to the above-described contents, and can be more easily understood in a process of explaining specific embodiments of the present disclosure.

In addition, the expression 'an embodiment' used in this specification does not mean the same embodiment, and may be provided to emphasize and describe different unique characteristics. However, an embodiment presented above may not be excluded from being implemented in combination with features of another embodiment. For example, although the description in a specific embodiment is not described in another example, it can be understood as an explanation related to another example, unless otherwise described or contradicted by the other embodiment.

The terms used in this disclosure are used only to illustrate various examples and are not intended to limit the present inventive concept. Singular expressions include plural expressions unless the context clearly dictates otherwise.

While example embodiments have been illustrated and described above, it will be apparent to those skilled in the art that modifications and variations could be made without departing from the scope of the present disclosure as defined by the appended claims.

What is claimed is:

1. A multilayer electronic component, comprising:
   a body including a capacitance forming portion including (i) a dielectric layer including a plurality of dielectric grains, and (ii) a plurality of internal electrodes alternately disposed to be stacked with the dielectric layer; and
   an external electrode disposed on the body,
   wherein the plurality of dielectric grains include (i) a first dielectric grain including a nano domain that is a domain region with a major diameter of 10 nm to 100 nm, and (ii) a second dielectric grain including a polar nano region including a domain region with a major diameter of less than 10 nm, and
   when a number of the first dielectric grain included in the capacitance forming portion is ND, and a number of the second dielectric grain included in the capacitance forming portion is RD, 50%<ND/(ND+RD) is satisfied.

2. The multilayer electronic component of claim 1, wherein 66%<ND/(ND+RD) is satisfied.

3. The multilayer electronic component of claim 1, wherein the capacitance forming portion comprise a plurality of the nano domain,
   wherein a total cross-sectional area of the plurality of the nano domain is 10% or more of a cross-sectional area of the capacitance forming portion.

4. The multilayer electronic component of claim 1, wherein the first dielectric grain comprises (i) three or more different nano domains, and (ii) a plurality of domain walls disposed between adjacent nano domains, where at least two of the plurality of domain walls are not parallel to each other.

5. The multilayer electronic component of claim 4, wherein a direction of a major diameter of each nano domain among the plurality of nano domains are not parallel.

6. The multilayer electronic component of claim 1, wherein the dielectric layer comprises a barium titanate (BaTiO₃)-based material as a main component.

7. The multilayer electronic component of claim 1, wherein an average diameter of the plurality of dielectric grains is 100 nm or more and 300 nm or less.

8. The multilayer electronic component of claim 1, wherein the plurality of dielectric grains comprise a plurality of the first dielectric grain, and an average diameter of the plurality of the first dielectric grain is 100 nm or more and 300 nm or less.

9. The multilayer electronic component of claim 1, wherein a major diameter of the nano domain is 26% or more of a diameter of the first dielectric grain.

10. The multilayer electronic component of claim 1, wherein an average thickness of the dielectric layer is 0.6 μm or less.

11. The multilayer electronic component of claim 1, wherein a length of the multilayer electronic component is 0.6 mm or less and a width of the multilayer electronic component is 0.3 mm or less.

12. A multilayer electronic component, comprising:

a body including a capacitance forming portion including (i) a dielectric layer including a plurality of dielectric grains, and (ii) a plurality of internal electrodes alternately disposed to be stacked with the dielectric layer; and an external electrode disposed on the body, wherein the plurality of dielectric grains include (i) a first dielectric grain including a nano domain that is a domain region with a major diameter of 10 nm to 100 nm, and (ii) a second dielectric grain including a polar nano region including a domain region with a major diameter of less than 10 nm, and a number of the first dielectric grain included in the capacitance forming portion is greater than a number of the second dielectric grain included in the capacitance forming portion.

13. The multilayer electronic component of claim 12, wherein the plurality of dielectric grains comprise a plurality of the first dielectric grain, an average diameter of the plurality of the first dielectric grain is 100 nm or more and 300 nm or less, and a total cross-sectional area of a plurality of the nano domain is 10% or more of a cross-sectional area of the capacitance forming portion.

14. The multilayer electronic component of claim 12, wherein the first dielectric grain comprises (i) three or more different nano domains, and (ii) a plurality of domain walls disposed between adjacent nano domains, where at least two of the plurality of domain walls are not parallel to each other.

15. The multilayer electronic component of claim 14, wherein a direction of a major diameter of each of at least two nano domains among the three or more different nano domains are not parallel.

16. The multilayer electronic component of claim 12, wherein a major diameter of the nano domain is 26% or more of a diameter of the first dielectric grain.

17. The multilayer electronic component of claim 16, wherein a length of the multilayer electronic component is 0.6 mm or less and a width of the multilayer electronic component is 0.3 mm or less.

18. A multilayer electronic component, comprising:

a body including a capacitance forming portion including (i) a dielectric layer including a plurality of dielectric grains, and (ii) a plurality of internal electrodes alternately disposed to be stacked with the dielectric layer; and an external electrode disposed on the body, wherein the plurality of dielectric grains include (i) a first dielectric grain including a nano domain that is a domain region with a major diameter of 80 nm to 100 nm, and (ii) a second dielectric grain including a polar nano region including a domain region with a major diameter of less than 10 nm.

19. The multilayer electronic component of claim 18, wherein a number of the first dielectric grain included in the capacitance forming portion is greater than a number of the second dielectric grain included in the capacitance forming portion.

20. The multilayer electronic component of claim 19, wherein the plurality of dielectric grains comprise a plurality of the first dielectric grain, an average diameter of the plurality of the first dielectric grain is 100 nm or more and 300 nm or less, and a total cross-sectional area of a plurality of the nano domain is 10% or more of a cross-sectional area of the capacitance forming portion.

21. The multilayer electronic component of claim 18, wherein the plurality of dielectric grains is free of a ferroelectric grain.

* * * * *